(12) United States Patent
Ling

(10) Patent No.: US 10,708,423 B2
(45) Date of Patent: Jul. 7, 2020

(54) METHOD AND APPARATUS FOR PROCESSING VOICE INFORMATION TO DETERMINE EMOTION BASED ON VOLUME AND PACING OF THE VOICE

(71) Applicants: ALIBABA GROUP HOLDING LIMITED, Grand Cayman (KY); Qing Ling, Hangzhou (CN)

(72) Inventor: Qing Ling, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 126 days.

(21) Appl. No.: 15/532,934

(22) PCT Filed: Dec. 3, 2015

(86) PCT No.: PCT/CN2015/096241
§ 371 (c)(1),
(2) Date: Jun. 2, 2017

(87) PCT Pub. No.: WO2016/091110
PCT Pub. Date: Jun. 16, 2016

(65) Prior Publication Data
US 2017/0346947 A1    Nov. 30, 2017

(30) Foreign Application Priority Data
Dec. 9, 2014    (CN) .......................... 2014 1 0748579

(51) Int. Cl.
*G06F 8/34*     (2018.01)
*G06F 3/01*     (2006.01)
(Continued)

(52) U.S. Cl.
CPC ........... *H04M 3/4936* (2013.01); *G10L 25/63* (2013.01); *H04M 3/4931* (2013.01); *H04M 3/5166* (2013.01); *H04M 3/5232* (2013.01)

(58) Field of Classification Search
CPC .................................... G06F 8/34; G06F 3/011
(Continued)

(56) References Cited

U.S. PATENT DOCUMENTS

| 5,559,927 A | 9/1996 | Clynes |
| 5,860,064 A * | 1/1999 | Henton ................. G10L 13/033 |
| | | 204/266 |

(Continued)

FOREIGN PATENT DOCUMENTS

| CN | 101662549 A | 3/2010 |
| CN | 101741953 A | 6/2010 |

(Continued)

OTHER PUBLICATIONS

Supplemental Search Report for European Application No. 15868151.0 dated Apr. 10, 2018, 3 pages.

(Continued)

*Primary Examiner* — Farzad Kazeminezhad
(74) *Attorney, Agent, or Firm* — Sheppard Mullin Richter & Hampton LLP

(57) ABSTRACT

A method and an apparatus for processing voice information are provided by the present application. The method comprises: obtaining the voice data of a user; performing an emotion analysis on the voice data which comprises multiplying volume and pacing of the voice data to help determine the priority of the voice data; and connecting the user to a corresponding service channel according to the priority of the voice data. The present application can improve the service quality of IVR.

18 Claims, 2 Drawing Sheets

Perform an emotion analysis on voice data to determine the volume and/or pacing of the user when the user sends the voice data — 1021

Obtain an emotion value of the user according to the volume and/or pacing — 1022

Obtain the priority of the user according to the emotion value of the user and a preset mapping relationship between the emotion value and the priority — 1023

(51) Int. Cl.
  *G10L 13/033* (2013.01)
  *H04M 3/493* (2006.01)
  *H04M 3/51* (2006.01)
  *H04M 3/523* (2006.01)
  *G10L 25/63* (2013.01)

(58) Field of Classification Search
  USPC .......................................... 717/109; 715/745
  See application file for complete search history.

(56) References Cited

U.S. PATENT DOCUMENTS

| | | | |
|---|---|---|---|
| 5,987,415 | A | 11/1999 | Breese et al. |
| 6,094,635 | A | 7/2000 | Scholz et al. |
| 6,144,938 | A | 11/2000 | Surace et al. |
| 6,411,687 | B1 | 6/2002 | Bohacek et al. |
| 6,490,564 | B1 | 12/2002 | Dodrill et al. |
| 6,658,388 | B1 | 12/2003 | Kleindienst et al. |
| 6,757,365 | B1 | 6/2004 | Bogard |
| 6,795,808 | B1 | 9/2004 | Strubbe et al. |
| 7,140,004 | B1 | 11/2006 | Kunins et al. |
| 7,222,075 | B2 | 5/2007 | Petrushin |
| 7,242,752 | B2 | 7/2007 | Chiu |
| 7,457,397 | B1 | 11/2008 | Saylor et al. |
| 7,665,024 | B1 * | 2/2010 | Kondziela .............. G06F 3/011 715/745 |
| 7,676,034 | B1 | 3/2010 | Wu et al. |
| 9,232,066 | B2 | 1/2016 | Kuang |
| 2003/0007609 | A1 | 1/2003 | Yuen et al. |
| 2004/0006476 | A1 | 1/2004 | Chiu |
| 2007/0198272 | A1 | 8/2007 | Horioka et al. |
| 2008/0086690 | A1 | 4/2008 | Verma et al. |
| 2012/0140916 | A1 | 6/2012 | Kuang |
| 2013/0051545 | A1 | 2/2013 | Ross et al. |
| 2016/0034260 | A1 * | 2/2016 | Ristock .................... G06F 8/34 717/109 |

FOREIGN PATENT DOCUMENTS

| | | | |
|---|---|---|---|
| CN | 101997996 | A | 3/2011 |
| CN | 102082879 | A | 6/2011 |
| CN | 102142253 | A | 8/2011 |
| CN | 102623009 | A | 8/2012 |
| CN | 102802114 | A | 11/2012 |
| CN | 103413113 | A | 11/2013 |
| CN | 103811009 | A | 5/2014 |
| EP | 1076329 | A2 | 2/2001 |
| GB | 2393605 | A | 3/2004 |
| JP | 2007219385 | A | 8/2007 |
| JP | 2009-182433 | A | 8/2009 |
| WO | 03/073417 | A2 | 9/2003 |
| WO | 2011017961 | A1 | 2/2011 |
| WO | 2011029306 | A1 | 3/2011 |

OTHER PUBLICATIONS

International Search Report and Written Opinion for Application No. PCT/CN2015/096241, dated Jan. 26, 2016, 8 pages.
Korean Office Action dated Jun. 21, 2018, issued in Korean Application No. 10-2017-7018385 (7 pages).
PCT International Preliminary Report on Patentability dated Jun. 22, 2017, issued in International Application No. PCT/CN2015/096241 (7 pages).
First Office Action for Chinese Application No. 201410748579.X, dated Feb. 1, 2018, 8 pages.
Search Report for Chinese Application No. 201410748579.X, dated Jan. 22, 2018, 1 page.
Office Action for Japanese Application No. 2017-530753, dated Oct. 9, 2018, 5 pages.
Second Office Action for Chinese Application No. 201410748579.X, dated Sep. 14, 2018, with English machine translation (18 pages).
Notice of Decision for Rejection issued for related Korean Patent Application No. 10-2017-7018385, dated Dec. 10, 2018 , 8 pages.
Notice of Decision for Rejection after re-examination issued for related Korean Patent Application No. 10-2017-7018385, dated Jan. 25, 2019 , 8 pages.
Office Action for Korean Application No. 10-2019-7008942 dated May 23, 2019 (11 pages).
Office Action for Korean Application No. 10-2019-7008942 dated Oct. 23, 2019 (8 pages).
Office Action for Korean Application No. 10-2019-7008942 dated Dec. 12, 2019 (7 pages).
Examination Report for European Application No. 15868151.0 dated Dec. 3, 2019 (4 pages).
First Examination Report for Indian Application No. 201747019240 dated Feb. 19, 2020.

* cited by examiner

METHOD AND APPARATUS FOR PROCESSING VOICE INFORMATION TO DETERMINE EMOTION BASED ON VOLUME AND PACING OF THE VOICE

CROSS-REFERENCE TO RELATED APPLICATIONS

This application is a national phase application of International Application No. PCT/CN2015/096241, filed on Dec. 3, 2015, which claims priority to and benefits of Chinese Patent Application No. 201410748579.X filed on Dec. 9, 2014. The contents of the above-referenced applications are incorporated herein by reference in their entirety.

TECHNICAL FIELD

The present application relates to the field of voice processing technologies, and in particular, to a method and an apparatus for processing voice information.

BACKGROUND ART

With the development of the Internet and communication technologies, users may communicate through the network or telephones, ask about some problems during the communication, and obtain related answers. For example, there are increasingly more customer service systems employing Interactive Voice Response (IVR) manners to communicate with users, so that the users can ask about some problems, and provide related answers for the users.

The process of using the IVR includes: a user is connected to a service center of IVR through a telephone, selects a service channel according to a voice prompt of the service center, and asks about a problem by using the selected service channel, where the selected service channel may be a manual service channel or an intelligent service channel. At present, the service mode of the IVR is monotonous, the service manner is not flexible enough, and thus the service quality of the IVR is low.

SUMMARY OF THE INVENTION

Multiple aspects of the present application provide a method and an apparatus for processing voice information, for improving the service quality of IVR.

In one aspect of the present application, a method for processing voice information is provided, including:

obtaining voice data for describing a problem asked about by a user;

performing an emotion analysis on the voice data to determine the priority of the user; and connecting the user to a corresponding service channel according to the priority of the user.

In another aspect of the present application, an apparatus for processing voice information is provided, including:

an obtaining module configured to obtain voice data for describing a problem asked about by a user;

an analysis module configured to perform an emotion analysis on the voice data to determine the priority of the user; and a service connection module configured to connect the user to a corresponding service channel according to the priority of the user.

In the present application, voice data of a user is obtained, an emotion analysis is performed on the voice data to determine the priority of the voice data, and the user is connected to a corresponding service channel according to the priority of the voice data. Compared with the prior art, the present application can connect the user to the corresponding service channel according to the priority of the voice data, and in this way, users can be connected to different service channels flexibly and timely. For example, a user having higher-priority voice data may be connected to a high-priority service channel, thus being conducive to improving the user experience and the speed of solving problems, and at the same time, expanding the service mode of the IVR, improving the flexibility of the service, and being conducive to improving the service quality of the IVR.

BRIEF DESCRIPTION OF THE DRAWINGS

In order to describe the technical solutions in the embodiments of the present application more clearly, the accompanying drawings to be used in the description about the embodiments or the prior art are introduced briefly in the following. It is apparent that the accompanying drawings in the following description are some embodiments of the present application, and those of ordinary skill in the art can also obtain other accompanying drawings according to the accompanying drawings without creative efforts.

DETAILED DESCRIPTION

In order to make the objectives, technical solutions and advantages of the embodiments of the present application clearer, the technical solutions in the embodiments of the present application will be clearly and completely described below with reference to the accompanying drawings in the embodiments of the present application. It is apparent that the embodiments described are merely some, instead of all, of the embodiments of the present application. Based on the embodiments in the present application, all other embodiments obtained by those of ordinary skill in the art without creative efforts shall fall within the protection scope of the present application.

Figure 1:
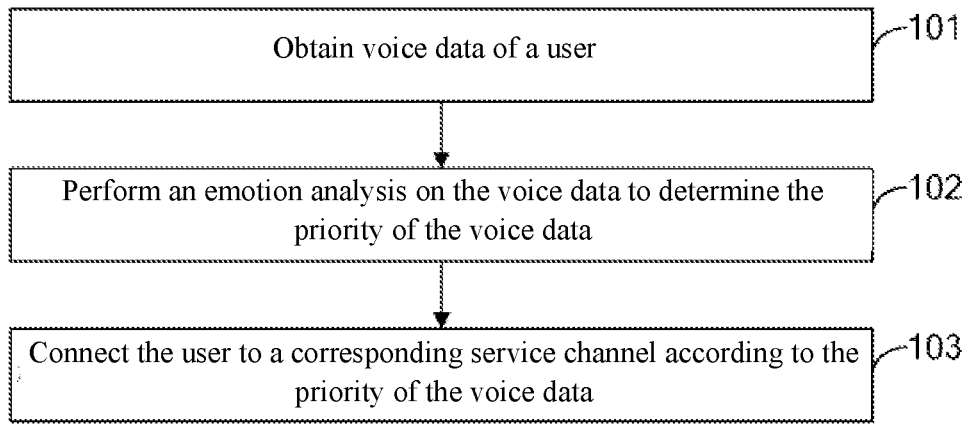
FIG. 1 is a schematic flowchart of a method for processing voice information according to an embodiment of the present application.

FIG. 1 is a schematic flowchart of a method for processing voice information according to an embodiment of the present application. As shown in FIG. 1, the method includes:

101: Voice data of a user is obtained.

102: An emotion analysis is performed on the voice data to determine the priority of the voice data.

103: The user is connected to a corresponding service channel according to the priority of the voice data.

This embodiment provides a method for processing voice information, which can be executed by an apparatus for processing voice information. During specific implementation, the apparatus for processing voice information may be any apparatus or device having a certain processing capability, and applicable to a customer service system providing a voice service, such as an IVR.

Specifically, the apparatus for processing voice information obtains voice data of a user, performs an emotion analysis on the voice data to determine the priority of the voice data, and then connects the user to a corresponding service channel according to the priority of the voice data.

It should be noted that, the priority of the voice data, to some extent, can indicate or reflect the priority of the user.

This embodiment performs the emotion analysis on the voice data to determine the priority of the voice data, and therefore, users can be connected to different service channels flexibly and timely according to the priority of the voice data. For example, the user having higher-priority voice data may be connected to a high-priority service channel, rather than selecting a service channel by the user according to a voice prompt in the prior art; therefore, the service mode of the IVR is expanded, and the service quality of the IVR is improved.

In an optional implementation, the voice data of the user may be voice data for describing a problem asked about by the user.

In an actual application, each application may generally provide a customer service system used for providing a communication platform for users using the application, for the users to ask about problems, learn related information, feedback suggestions, and the like.

In this embodiment, the customer service system provides at least one service channel (or service manner). For example, it may include a manual channel and an intelligent channel. The manual channel mainly refers to that a customer service representative provides a service for the user in a voice manner; and the intelligent channel refers to a non-manual service manner including, for example, an online chatting service, an online self-service, and the like.

In this embodiment, the service channel is classified according to the priority. The priority of the manual channel should be higher than that of the intelligent channel. In addition, the manual channel may be further classified into a common manual channel, a specialist manual channel, and the like. The priority of the specialist manual channel is higher than that of the common manual channel. The higher the priority of the service channel is, the better the provided service quality is. For example, the service quality that can be provided by the specialist manual channel is higher than that of the common manual channel. The service quality of different service channels may be determined by multiple factors such as the complexity of solvable problems, service attitude, speed of solving problems, and flexibility of solving problems.

A specific process of applying the method provided in this embodiment to a customer service system includes: when a user needs to ask about a problem, voice data for describing the problem asked about by the user is obtained, an emotion analysis is performed on the voice data to obtain an emotion of the user when the user describes the problem asked about and determine the priority of the voice data according to the emotion of the user when the user asks about the problem, and then the user is connected to a corresponding service channel according to the priority of the voice data.

It can be seen that, this embodiment, by performing the emotion analysis on the voice data of the user when the user asks about the problem, can embody the priority of the user through the priority of the voice data, thus distinguishing users, and then connecting users with different priorities to different service channels, which is conducive to improving the user experience and the speed of solving problems, and conducive to improving the service quality of the customer service system. In addition, compared with the prior art, the method provided in this embodiment can embody the priority of the user through the priority of the voice data, which is equivalent to distinguishing the users, for example, rather than treating all users uniformly as in the prior art. A user having an urgent request may be connected to a manual channel preferentially, thus expanding the service mode of the customer service system, and improving the flexibility of the service.

Figure 2:
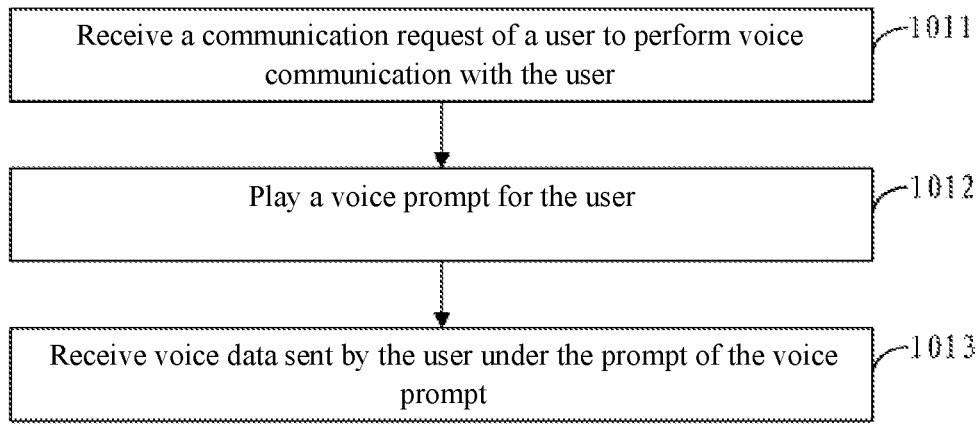
FIG. 2 is a schematic flowchart of an implementation of step 101 according to an embodiment of the present application.

In an optional implementation, an implementation of step 101 is as shown in FIG. 2, specifically including:

1011: A communication request of a user is received, to perform voice communication with the user.

1012: A voice prompt is played for the user.

1013: Voice data sent by the user under the prompt of the voice prompt is received.

In an optional implementation, the voice prompt may be a problem description prompt for instructing the user to describe the problem asked about. Correspondingly, the user may, under the prompt of the problem description prompt, send voice data for describing the problem asked about.

Specifically, for some customer service systems providing voice services for users, such as the IVR, when the user asks about a problem to the customer service system, the user generally dials a corresponding customer service hotline through a communication terminal such as a mobile phone and a fixed telephone, to send a communication request to an apparatus for processing voice information in the customer service system, and the apparatus for processing voice information receives the communication request to establish a voice communication with the user. Then, the apparatus for processing voice information plays a problem description prompt for the user, to prompt the user to describe the problem asked about. For example, the problem description prompt may be voices such as "please describe your problem with one sentence" and "what is the problem you want to ask about". The user describes the problem asked about according to the problem description prompt, to form voice data describing the problem asked about. For example, the voice data may be voices such as "I forget the password" and "I cannot log in normally after entering the account and the password".

It should be noted that, in addition to employing the above manner to obtain the voice data for describing the problem asked about by the user, the apparatus for processing voice information may also employ other manners. For example, the apparatus for processing voice information may obtain, from another device (for example, a user terminal), the voice data for describing the problem asked about by the user.

Figure 3:
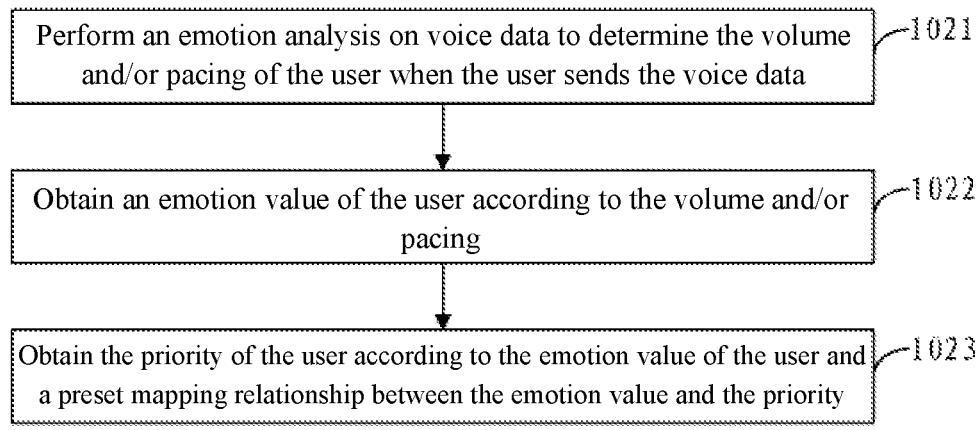
FIG. 3 is a schematic flowchart of an implementation of step 102 according to an embodiment of the present application.

The apparatus for processing voice information, after obtaining the voice data, may perform an emotion analysis on the voice data to determine the priority of the voice data. In an optional implementation, an implementation of step 102 is as shown in FIG. 3, specifically including:

1021: An emotion analysis is performed on the voice data to determine the volume and/or pacing of the user when the user sends the voice data.

1022: An emotion value of the user is obtained according to the volume and/or pacing.

1023: The priority of the user is obtained according to the emotion value of the user and a preset mapping relationship between the emotion value and the priority.

The emotion analysis is a kind of semantic analysis, and belongs to the prior art. Various methods capable of analyzing the volume and pacing are applicable to this embodiment. For example, the process of analyzing the pacing may be: calculating a short-time average amplitude of the voice data after the voice data is obtained, and then analyzing start and end points of the voice data according to the short-time average amplitude to calculate the pacing of the voice data.

A sound is formed by several (or infinite) frequency components. A frequency spectrum is generally used to detect and describe characteristics of the sound. Therefore, the process of analyzing the volume may be: converting the voice data from a time-domain signal into a frequency-domain signal, dividing the octave, and converting the frequency-domain signal from an absolute magnitude into a relative magnitude, that is, decibel (DB), to obtain the volume of the voice data.

The apparatus for processing voice information performs the emotion analysis on the voice data to obtain the pacing and/or volume of the user when the user describes the problem asked about. The pacing and the volume may reflect the emotion of the user, such as, anxiety, anger, and calmness.

For the volume, when the volume is between 0 DB and 20 DB, it is very quiet and is hardly heard. When the volume is between 20 DB and 40 DB, it is quiet and sounds like a whisper, indicating that the user is relatively peaceful. When the volume is between 40 DB and 60 DB, it is a general and common indoor talk, indicating that the user is emotionally stable. When the volume is between 60 DB and 70 DB, it is noisy and harmful to nerves, indicating that the user is anxious or angry.

For the pacing, the pacing of a normal person is 70-90 words per minute in a common context, and if the time for describing the problem asked about with one sentence is 15 seconds, about 18-23 words should be included. If the pacing of the user when the user asks about the problem is fewer than or about 18-23 words, it indicates that the user is relatively peaceful, and the problem asked about may not be urgent. On the contrary, if the pacing of the user when the user asks about the problem is more than 23 words, for example, the pacing when asking about the problem is about 25-32 words, it indicates that the user is rather anxious, and the problem asked about may be urgent.

Based on this, the apparatus for processing voice information, after obtaining the volume and/or pacing of the user when the user describes the problem asked about, further obtains the emotion value of the user according to the volume and/or pacing.

Optionally, numerical processing may be performed on the volume and/or pacing, and the result of the numerical processing is used as the emotion value of the user. The manner of numerical processing may be weighted averaging, weighting, or the like.

For example, an implementation includes: using, by the apparatus for processing voice information, a product of the volume and a weight as the emotion value of the user. When the weight is 1, the volume may be directly used as the emotion value of the user.

For another example, an implementation includes: using, by the apparatus for processing voice information, a product of the pacing and a weight as the emotion value of the user. When the weight is 1, the pacing may be directly used as the emotion value of the user.

For another example, an implementation includes: performing, by the apparatus for processing voice information, numerical processing on the volume and the pacing, and using the result of the numerical processing as the emotion value of the user. For example, the apparatus for processing voice information multiplies the volume and the pacing, and uses the result of multiplication as the emotion value of the user; or, the apparatus for processing voice information may perform weighted averaging on the volume and the pacing, and use the result as the emotion value of the user. The manner of the numerical processing is not limited to multiplying and weighted averaging.

After the emotion value of the user is obtained, the apparatus for processing voice information matches the emotion value of the user in the preset mapping relationship between the emotion value and the priority, and the priority matched is used as the priority of the user.

It should be noted that, the mapping relationship between the emotion value and the priority may specifically be: a correspondence between an emotion value range and the priority, for example, an emotion value range 0-10 corresponds to the priority −1, an emotion value range 10-20 corresponds to the priority 0, an emotion value range 20-30 corresponds to the priority 1, and an emotion value range above 30 corresponds to the priority 2. Alternatively, the mapping relationship between the emotion value and the priority may specifically be: a correspondence between an emotion value threshold and the priority, for example, an emotion value threshold 10 corresponds to the priority −1, an emotion value threshold 20 corresponds to the priority 0, an emotion value threshold 30 corresponds to the priority 1, and an emotion value threshold corresponding to the priority 2 is not limited.

In an optional implementation, the apparatus for processing voice information presets a mapping relationship between the priority and the service channel, and the service channel includes a manual channel and an intelligent channel. Further optionally, the manual channel may be further classified into a common manual channel and a specialist manual channel. The apparatus for processing voice information specifically matches the priority of the user in the preset mapping relationship between the priority and the service channel; when a manual channel is matched, the user is connected to the manual channel, and specifically, a call request of the user is connected to a client of a customer service representative in the manual channel. When an intelligent channel is matched, the user is connected to the intelligent channel, and specifically, the apparatus for processing voice information may guide, in a manner of voice broadcast, the user to solve the problem.

For example, the priority 2 corresponds to the specialist manual channel, the priority 1 corresponds to the common manual channel; and the priority 0 and the priority −1 correspond to the intelligent channel. It is assumed that the priority of the user is 2, then the apparatus for processing voice information needs to connect the user to the specialist manual channel.

Further, the apparatus for processing voice information may further generate, according to the voice data, reference information for responding to the problem asked about by the user, and provide the reference information for the customer service representative corresponding to the manual channel, so that the customer service representative responds to the problem for the user according to the reference information, thus improving the efficiency and quality of responding to the problem.

The manner of generating the reference information includes, but not limited to that: a semantic information processing apparatus performs text conversion on the voice data, recognizes text information to determine a category of the problem asked about by the user, acquires account information of the user, and dynamically assembles the category of the problem asked about by the user and the account information of the user to generate the reference information. The reference information may be in a form of voice, or a form of text.

It should be noted that, although the above embodiment emphasizes how the priority of the user is used to determine the service channel to which the user should be connected, the embodiment of the present application is not limited to separately using the priority of the user to determine the service channel to which the user should be connected, and the priority of the user may be further used in combination with other information. For example, the priority of the user may be combined with a method, which has been implemented in the existing IVR, for determining a service channel to which the user is connected (for example, determining, based on the category of the problem asked about by the user, the service channel to which the user should be connected). The specific combination manner may include: considering the priority of the user first, and then considering the category of the problem asked about by the user; or considering the category of the problem asked about by the user first, and then considering the priority of the user; or, considering the category of the problem asked about by the user and the priority of the user at the same time.

Figure 4:
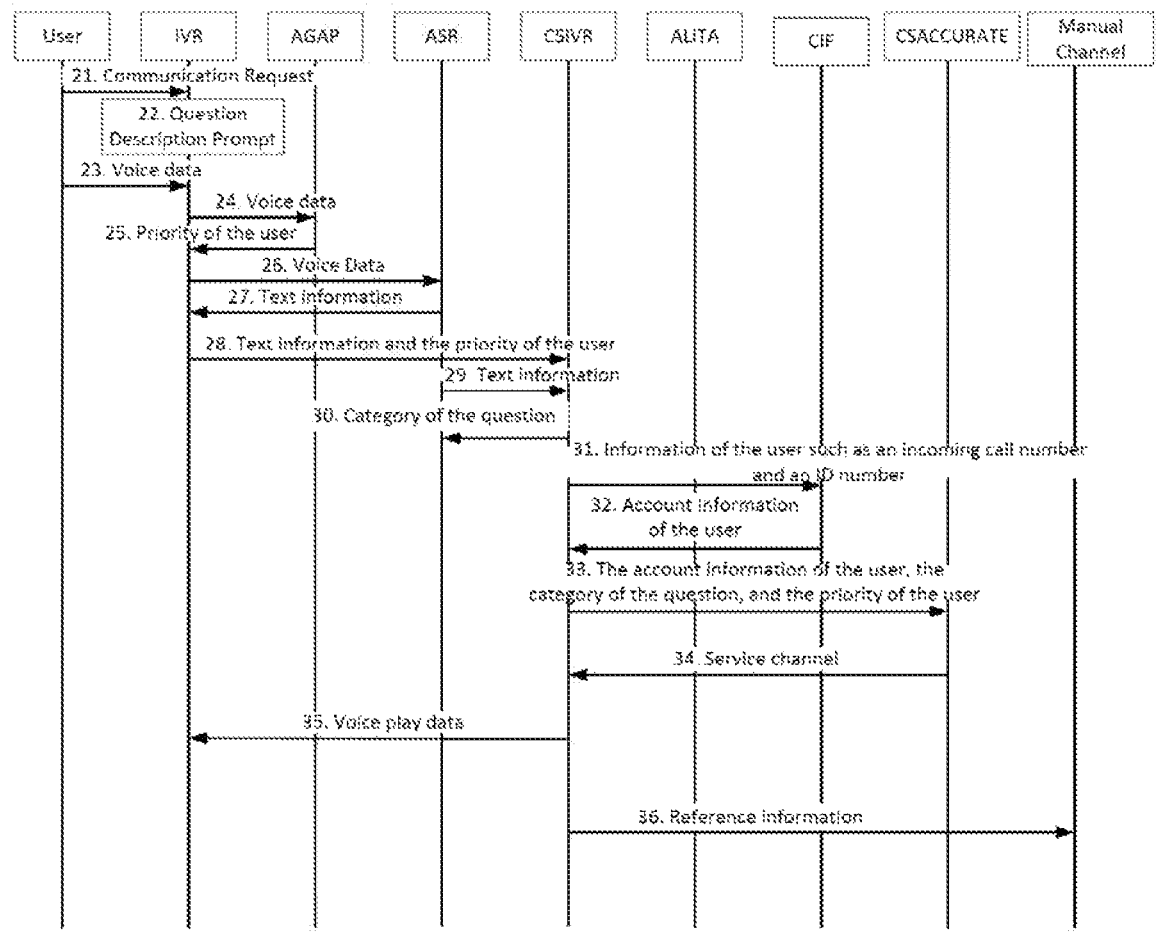
FIG. 4 is a schematic flowchart of a method for processing voice information according to another embodiment of the present application.

The following embodiment shown in FIG. 4 provides a detailed flow of determining a service channel for a user by using the priority of the user. In the embodiment shown in FIG. 4, modules may specifically construct the apparatus for processing voice information.

FIG. 4 is a schematic flowchart of a method for processing voice information according to an embodiment of the present invention. As shown in FIG. 4, the method includes:

21: An interactive voice response (IVR) module receives a communication request sent by a user, to establish a voice communication with the user.

22: The IVR module plays a problem description prompt for the user, to prompt the user to describe the problem asked about.

23: The IVR module receives voice data generated by the user when the user describes the problem asked about.

24: The IVR module sends the voice data to an Alipay general algorithm platform (AGAP) module.

25: The AGAP module performs an emotion analysis on the voice data to obtain the volume and/or pacing of the user, obtains the priority of the user according to the volume and/or pacing, and returns the priority of the user to the IVR module.

26: The IVR module sends the voice data to an automatic speech recognition (ASR) module.

27: The ASR module performs text conversion on the voice data to obtain text information, and returns the text information to the IVR module.

28: The IVR module provides the text information and the priority of the user to a customer service interactive voice response (CSIVR) module.

29: The CSIVR module sends the text information to an Alipay text analyze (ALITA) module.

30: The ALITA module performs a semantic analysis on the text information to determine a category of the problem, and returns the determined category of the problem to the CSIVR module.

31: The CSIVR module provides information of the user such as an incoming call number and an ID number to a customer information file (CIF) module.

32: The CIF module obtains account information of the user according to the incoming call number and the ID number of the user, and returns the account information of the user to the CSIVR module.

33: The CSIVR module sends the account information of the user, the category of the problem and the priority of the user to a customer service accurate (CSACCURATE) module.

34: The CSACCURATE module determines, according to the account information of the user, the category of the problem and the priority of the user, a service channel corresponding to the user, and returns identification information of the determined service channel to the CSIVR module.

In this implementation, the CSACCURATE module considers the category of the problem and the priority of the user at the same time, to determine the service channel to which the user should be connected.

For example, it is assumed that the user is determined as an invalid user according to the category of the problem asked about by the user, and the priority of the user is determined as −1 according to the volume and pacing of the user when the user asks about the problem, the user may be connected to the intelligent channel. It is assumed that the user is determined as an asking user according to the category of the problem asked about by the user, and the priority of the user is determined as 0 according to the volume and pacing of the user when the user asks about the problem, the user may be connected to the intelligent channel. It is assumed that the user is determined as a service requesting user according to the category of the problem asked about by the user, and the priority of the user is determined as 1 according to the volume and pacing of the user when the user asks about the problem, the user may be connected to the common manual channel. It is assumed that the user is determined as a user with urgent requests according to the category of the problem asked about by the user, and the priority of the user is determined as 2 according to the volume and pacing of the user when the user asks about the problem, the user may be connected to the specialist manual channel.

35: If the service channel is the intelligent channel, the CSIVR module generates corresponding voice play data according to the account information of the user, the category of the problem and the priority of the user, and returns the voice play data to the IVR module, for the IVR module to guide the user to solve the problem.

36: If the service channel is the manual channel, the CSIVR module generates reference information according to the account information of the user, the category of the problem and the priority of the user, connects the user to the manual channel, and at the same time, provides the reference information for a customer service representative in the manual channel.

In this embodiment, the priority of the user may be determined according to the emotion of the user when the user asks about the problem, and the user is connected to a corresponding service channel based on the priority; in this way, users of different priorities may be connected to different service channels flexibly and timely. For example, a user of the higher priority may be connected to the high-priority service channel, thus being conducive to improving the user experience and the speed of solving problems, and meanwhile, expanding the service mode of the IVR, improving the flexibility of the service, and being conducive to improving the service quality of the IVR.

It should be noted that, for ease of description, the method embodiments mentioned above are all described as a combination of a series of actions; however, those skilled in the art should know that the present application is not limited to the action order described herein, this is because some steps may be performed in other orders or simultaneously according to the present application. Next, those skilled in the art should also know that the embodiments described in the specification are all preferred embodiments, and actions and modules involved therein are not necessarily required by the present application.

In the above embodiments, the descriptions on the embodiments have respective emphasis, and for parts that are not described in detail in an embodiment, one may refer to related descriptions in other embodiments.

Figure 5:
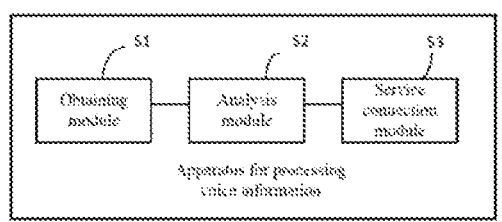
FIG. 5 is a schematic structural diagram of an apparatus for processing voice information according to another embodiment of the present application.

FIG. 5 is a schematic structural diagram of an apparatus for processing voice information according to an embodiment of the present application. As shown in FIG. 5, the apparatus includes: an obtaining module 51, an analysis module 52, and a service connection module 53.

The obtaining module 51 is configured to obtain voice data of a user.

The analysis module 52 is connected to the obtaining module 51, and configured to perform an emotion analysis on the voice data obtained by the obtaining module 51, to determine the priority of the voice data.

The service connection module 53 is connected to the analysis module 52, and configured to connect the user to a corresponding service channel according to the priority of the voice data determined by the analysis module 52.

It should be noted that, the priority of the voice data, to some extent, can indicate or reflect the priority of the user.

In an optional implementation, the voice data of the user may be voice data for describing the problem asked about by the user.

In an optional implementation, the obtaining module 51 is specifically configured to: receive a communication request of the user, to perform voice communication with the user; play a voice prompt for the user; and receive voice data sent by the user under the prompt of the voice prompt.

In an optional implementation, the voice prompt may be a problem description prompt, for instructing the user to describe the problem asked about. Correspondingly, the user can, under the prompt of the problem description prompt, send the voice data for describing the problem asked about.

In an optional implementation, the analysis module 52 is specifically configured to: perform an emotion analysis on the voice data, to determine the volume and/or pacing of the user when the user sends the voice data; obtain an emotion value of the user according to the volume and/or pacing; and obtain the priority of the user according to the emotion value of the user and a preset mapping relationship between the emotion value and the priority.

The analysis module 52 is specifically configured to: perform an emotion analysis on the voice data, to determine the volume and/or pacing of the user when the user sends the voice data; perform numerical processing on the volume and/or pacing, and use the result of the numerical processing as an emotion value of the user, and obtain the priority of the voice data according to the emotion value of the user and a preset mapping relationship between the emotion value and the priority.

In an optional implementation, the service connection module is specifically configured to: match the priority of the voice data in a preset mapping relationship between the priority and the service channel; and when a manual channel is matched, connect the user to the manual channel.

In an optional implementation, the apparatus for processing voice information further includes: a reference processing module configured to generate reference information according to the voice data, and provide the reference information for a customer service representative corresponding to the manual channel.

It should be noted that, in addition to employing the implementation structure shown in FIG. 5, the apparatus for processing voice information may further employ the implementation structure in the embodiment shown in FIG. 2, to form an IVR system.

The apparatus for processing voice information according to this embodiment can connect the user to the corresponding service channel according to the priority of the voice data, and in this way, users can be connected to different service channels flexibly and timely, for example, a user having higher-priority voice data may be connected to a high-priority service channel, thus being conducive to improving the user experience and the speed of solving problems, and at the same time, expanding the service mode of the IVR, improving the flexibility of the service, and being conducive to improving the service quality of the IVR.

Those skilled in the art can clearly understand that, for convenience and clarity of description, specific working processes of the system, apparatus and units described in the above may be obtained with reference to the corresponding processes in the foregoing method embodiment, and are not repeated herein.

In the several embodiments provided in the present application, it should be understood that, the disclosed system, apparatus and method may be implemented in other manners. For example, the apparatus embodiment described in the foregoing is merely schematic, for example, the division of units is merely division of logic functions, and in fact, there may be other division manners during implementation, for example, multiple units or components may be combined or may be integrated into another system, or some features may be omitted or not be executed. On the other hand, the displayed or discussed mutual coupling or direct coupling or communication connection may be implemented through indirect coupling or communication connection between some interfaces, apparatuses or units, and may be in electrical, mechanical or other forms.

Units described as separate parts may or may not be physically separated, parts displayed as units may or may not be physical units, that is, they may be located at the same place, or be distributed to multiple network units. The objective of the solution of this embodiment may be implemented by selecting a part of or all units thereof according to actual requirements.

In addition, various function units in the embodiments of the present application can be integrated in one processing unit, each unit may also exist as a separate physical unit, and two or more units may also be integrated in one unit. The integrated unit may be implemented in a form of hardware, and may also be implemented in a form of hardware plus a software function unit.

The integrated unit implemented in a form of a software function unit may be stored in a computer readable storage medium. The software function unit is stored in a storage medium, and includes several instructions used to enable a computer device (which may be a personal computer, a server, a network device, or the like) or processor to execute a part of steps of the methods in the embodiments of the present application. The storage medium includes: a USB flash disk, a mobile hard disk, a Read-Only Memory (ROM), a Random Access Memory (RAM), a magnetic disk, an optical disc, or other media that can store program codes.

Finally, it should be noted that, the above embodiments are merely used for describing the technical solution of the present application, instead of limiting the present application; although the present application is described in detail with reference to the foregoing embodiments, those of ordinary skill in the art should understand that they can still make modifications on the technical solution described in the above embodiments, or perform equivalent replacements on a part of technical features thereof; and these modifications or replacements are not intended to make the essences of the corresponding technical solutions depart from the spirit and scope of the technical solutions of the embodiments of the present application.

The invention claimed is:

1. A method for processing voice information, comprising:
   obtaining voice data of a user in an intelligent channel configured to play an automated voice prompt;
   performing text conversion on the voice data to determine a category of problem from categories including invalid user, inquiry user, service requesting user and urgent request user;
   performing an emotion analysis on the voice data to determine an emotion value, wherein performing the emotion analysis on the voice data comprises performing numerical processing on volume and pacing of the voice data, wherein the performing numerical processing on volume and pacing of the voice data comprises multiplying the volume and the pacing;
   determining that the emotion value reaches a threshold; and
   connecting, in response to the determining that the emotion value reaches a threshold and determining that the category of problem is a service requesting user or an urgent request user, the user to a manual channel attended by a human.

2. The method according to claim 1, wherein the performing an emotion analysis on the voice data comprises:
   obtaining a priority of the voice data according to the emotion value and a preset mapping relationship between the emotion value and the priority.

3. The method according to claim 2, wherein the performing an emotion analysis on the voice data to determine an emotion value comprises:
   using the result of the numerical processing as the emotion value.

4. The method according to claim 1, wherein the obtaining voice data of a user comprises:
   receiving a communication request of the user to perform voice communication with the user;
   playing the automated voice prompt for the user; and
   receiving the voice data sent by the user under the prompt of the voice prompt.

5. The method according to claim 1, wherein connecting the user to the manual channel comprises:
   obtaining a priority of the voice data based on the emotion value; and
   matching the priority of the voice data to the manual channel based on a preset mapping relationship.

6. The method according to claim 1, further comprising:
   generating reference information according to the voice data; and
   providing the reference information for a customer service representative corresponding to the manual channel.

7. The method according to claim 1, wherein the performing numerical processing on volume and pacing of the voice data comprises: assigning a weight to the volume and pacing respectively.

8. A non-transitory computer readable medium comprising program instructions which, when executed by a computer, cause the computer to perform a method comprising:
   obtaining voice data of a user in an intelligent channel configured to play an automated voice prompt;
   performing text conversion on the voice data to determine a category of problem from categories including invalid user, inquiry user, service requesting user and urgent request user;
   performing an emotion analysis on the voice data to determine an emotion value, wherein performing the emotion analysis on the voice data comprises performing numerical processing on volume and pacing of the voice data, wherein the performing numerical processing on volume and pacing of the voice data comprises multiplying the volume and the pacing;
   determining that the emotion value reaches a threshold; and
   connecting, in response to the determining that the emotion value reaches a threshold and determining that the category of problem is a service requesting user or an urgent request user, the user to a manual channel attended by a human.

9. The non-transitory computer readable medium according to claim 8, wherein the performing an emotion analysis on the voice data comprises:
   obtaining a priority of the voice data according to the emotion value and a preset mapping relationship between the emotion value and the priority.

10. The non-transitory computer readable medium according to claim 9, wherein the performing an emotion analysis on the voice data to determine an emotion value comprises:
    using the result of the numerical processing as the emotion value.

11. The non-transitory computer readable medium according to claim 8, wherein the obtaining voice data of a user comprises:
    receiving a communication request of the user to perform voice communication with the user;
    playing the automated voice prompt for the user; and
    receiving the voice data sent by the user under the prompt of the voice prompt.

12. The non-transitory computer readable medium according to claim 8, wherein connecting the user to the manual channel comprises:
    obtaining a priority of the voice data based on the emotion value; and
    matching the priority of the voice data to the manual channel based on a preset mapping relationship.

13. The non-transitory computer readable medium according to claim 8, further comprising:
    generating reference information according to the voice data; and
    providing the reference information for a customer service representative corresponding to the manual channel.

14. The non-transitory computer readable medium according to claim 8, wherein the performing numerical processing on volume and pacing of the voice data comprises: assigning a weight to the volume and pacing respectively.

15. A method for processing voice information, comprising:
    obtaining voice data of a user;
    performing an emotion analysis on the voice data to determine an emotion value, wherein performing the emotion analysis on the voice data comprises performing numerical processing on volume and pacing of the voice data, and the emotional value is determined at least based on multiplying the volume and the pacing;

determining a priority of the voice data according to the emotional value based on a preset mapping relationship between the emotion value and the priority; and connecting the user to a corresponding service channel according to the priority of the voice data.

16. The method according to claim 15, wherein the obtaining voice data of a user comprises:

receiving a communication request of the user to perform voice communication with the user;

playing a voice prompt for the user; and receiving the voice data sent by the user under the prompt of the voice prompt.

17. The method according to claim 15, wherein the connecting the user to a corresponding service channel according to the priority of the voice data comprises:

determining that the priority is high in response to the emotion value reaching a threshold; and connecting the user to a corresponding service manual channel attended by a human.

18. The method according to claim 15, further comprising:

generating reference information according to the voice data; and providing the reference information for a customer service representative corresponding to the manual channel.

* * * * *